United States Patent [19]
Hansel

[11] 3,881,510
[45] May 6, 1975

[54] VALVED VAPOR SEAL FOR UNDERGROUND TANKS

[75] Inventor: William B. Hansel, Media, Pa.

[73] Assignee: Sun Oil Company of Pennsylvania, Philadelphia, Pa.

[22] Filed: Jan. 2, 1974

[21] Appl. No.: 430,333

[52] U.S. Cl. ............... 137/590; 137/559; 141/290; 220/85 VS
[51] Int. Cl. ............................. F17d 1/00
[58] Field of Search .................... 137/559, 587, 590; 141/290, 326; 220/85 VR, 85 VS

[56] References Cited
UNITED STATES PATENTS

| | | | |
|---|---|---|---|
| 1,521,817 | 1/1925 | Jerdone | 137/590 X |
| 2,891,606 | 6/1959 | Horton | 137/209 |
| 3,490,473 | 1/1970 | Ehrens et al. | 251/149.4 X |
| 3,736,950 | 6/1973 | Smallwood | 137/202 |
| 3,785,413 | 1/1974 | Taverner et al. | 141/290 X |
| 3,807,433 | 4/1974 | Byrd | 141/290 X |

*Primary Examiner*—Alan Cohan
*Assistant Examiner*—Gerald A. Michalsky
*Attorney, Agent, or Firm*—George L. Church; Donald R. Johnson; Frank A. Rechif

[57] ABSTRACT

In order to permit gauging of an underground liquid hydrocarbon storage tank in a conventional manner through the gauge connection without allowing escape of vapor to the atmosphere while gauging, while yet enabling use of the gauge connection for vapor return purposes during tank filling, a valving arrangement is utilized in the gauge connection to selectively seal off the tank vapor space from the gauge contraction or to couple the tank vapor space to such connection.

2 Claims, 4 Drawing Figures

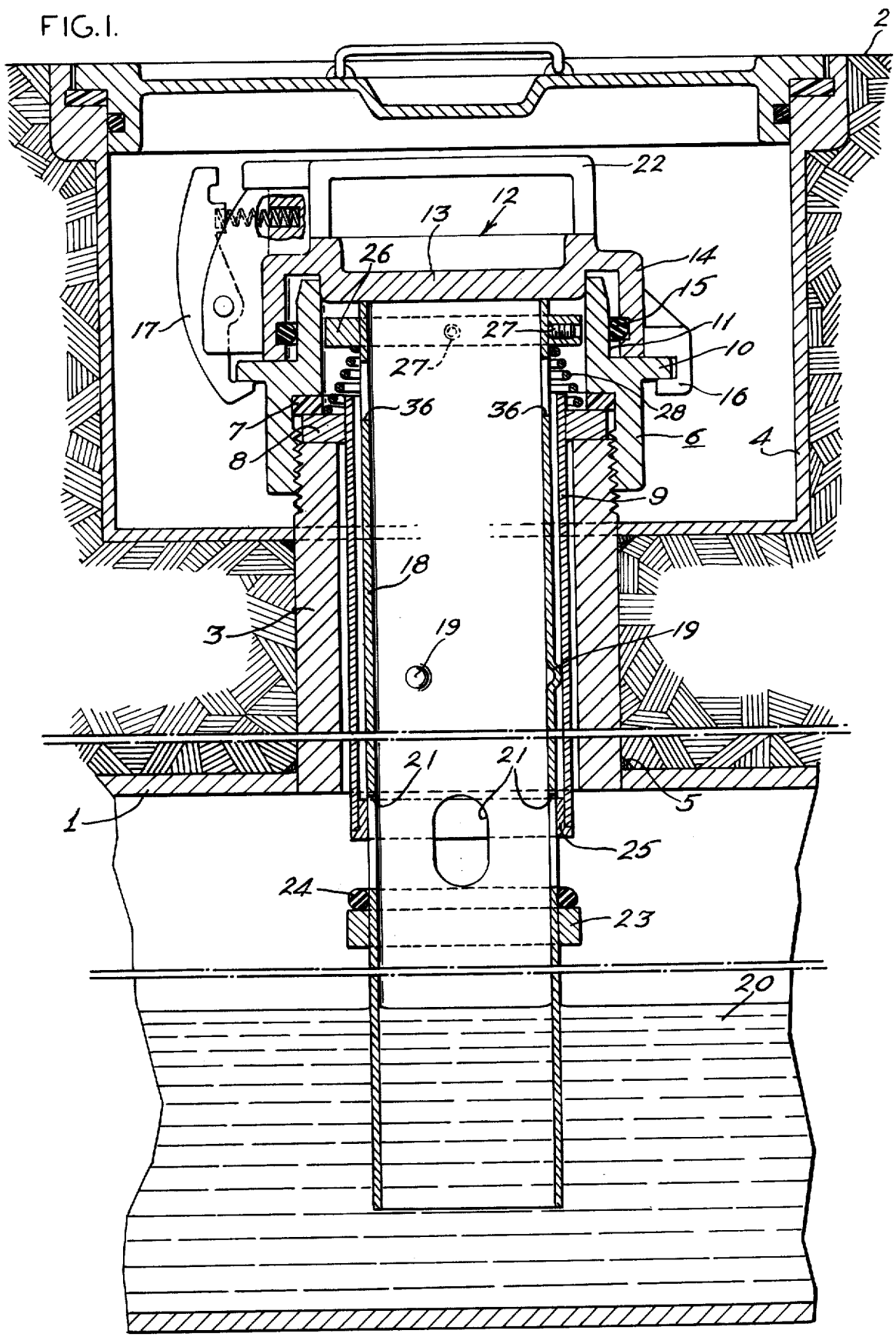

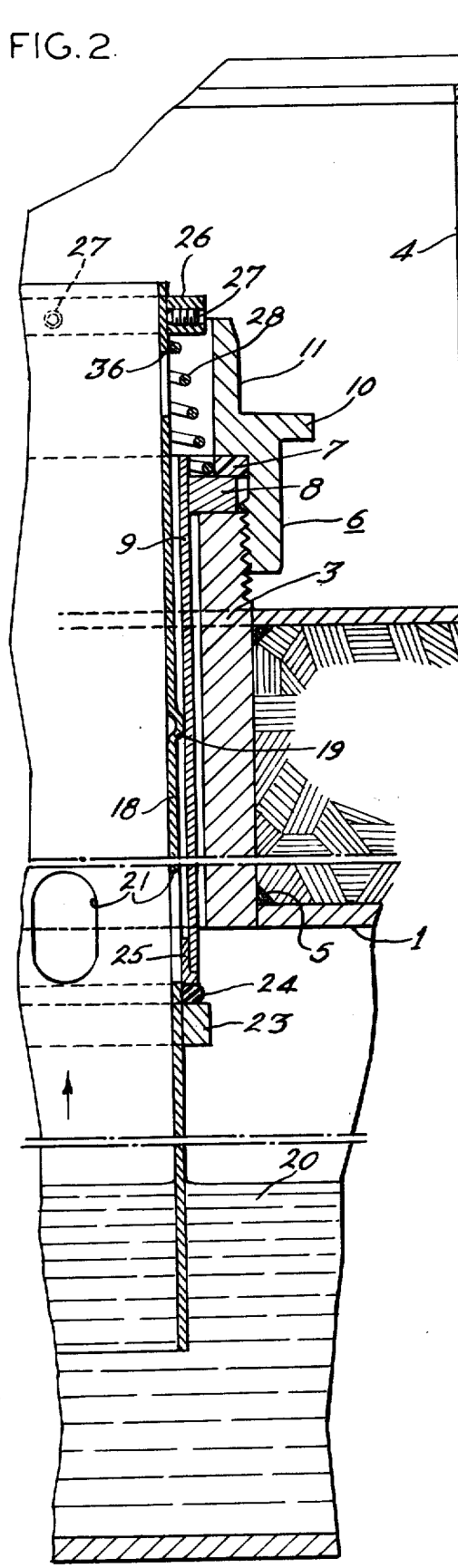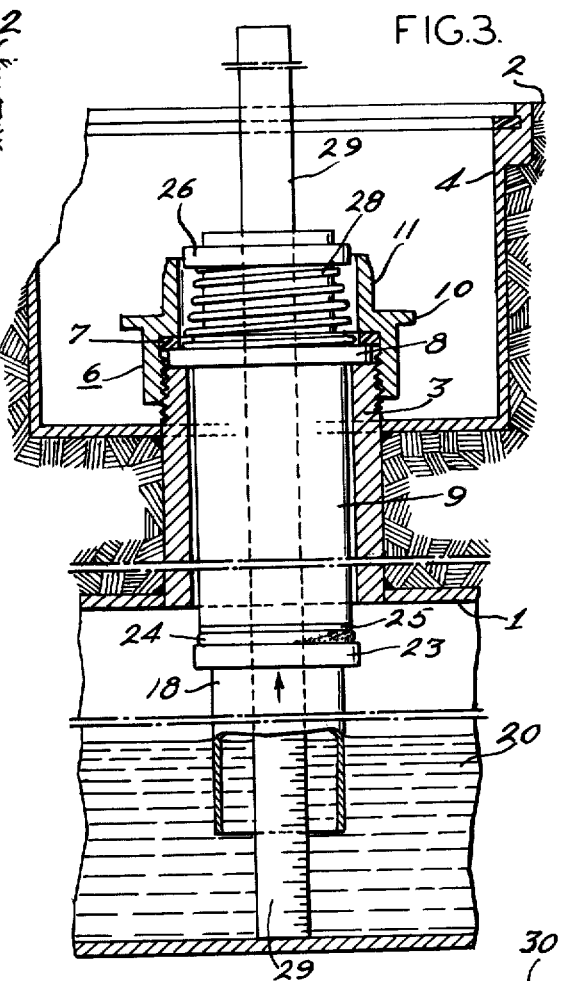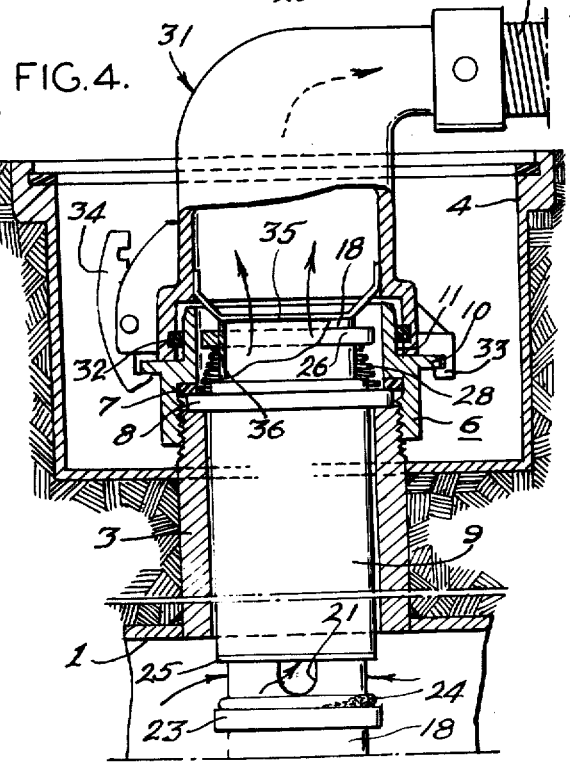

VALVED VAPOR SEAL FOR UNDERGROUND TANKS

This invention relates to subterranean tanks for the storage of liquid fuel at service stations, and more particularly to a valved vapor seal for such tanks.

It is highly advantageous to gauge underground tanks, and also to sample the sediment (if any) present at the bottom of such tanks, in a simple and convenient manner; this is ordinarily done by the use of a gauge stick, through the conventional gauge connection or gauge hole of the tank. However, with the advent of vapor recovery at service stations, some regulatory groups are asking for a completely vapor tight system for the underground tanks, which would prohibit opening the tanks even for gauging purposes unless a vapor seal is provided on the gauge hole.

Further, a vapor recovery system which has found some favor (shown in copending application Ser. No. 278,888, filed Aug. 9, 1972, now U.S. Pat. No. 3,807,433) uses the tank gauge hole for a vapor return line to the tank truck, during a delivery to the underground tank. Such a system would require that the tank vapor space be in communication with the gauge hole; the gauge hole-vapor seal requirement previously mentioned would therefore foreclose the utilization of a vapor recovery system of the type mentioned.

An object of this invention is to provide a valved vapor seal for underground tanks.

Another object is to provide an arrangement for subterranean tanks which will allow gauging through the tank gauge hole, while providing a positive vapor seal during such gauging.

A further object is to provide an arrangement for subterranean tanks which will allow both gauging and vapor return to be effected through the tank gauge hole, while providing a positive vapor seal during the gauging.

A still further object is to provide a novel valving arrangement for the gauge holes of underground tanks.

Yet another object is to provide a valving arrangement for tank gauge holes which will automatically, and selectively, seal off the tank vapor space from the gauge hole, or couple the tank vapor space to such hole.

The objects of this invention are accomplished, briefly, in the following manner: Two coaxial tubes, the inner one of which is arranged to slide within the outer, are mounted within the tank gauge pipe. The inner tube extends down to a point close to the tank bottom, and it has openings therein just below the top of the tank. The inner tube is spring-loaded in such a way that its openings are normally sealed off by the outer tube from the tank vapor space, but are uncovered when a vapor return hose is coupled to the upper end of the tank gauge pipe.

A detailed description of the invention follows, taken in conjunction with the accompanying drawings, wherein:

FIG. 1 is a vertical section through a tank gauge pipe equipped with the apparatus of this invention, with a cap in position on the pipe;

FIG. 2 is a partial view similar to FIG. 1, but with the cap removed;

FIG. 3 is a sectional view on a smaller scale of the apparatus, illustrating the gauge pipe being used for gauging; and FIG. 4 is a partial view similar to FIG. 3, but illustrating the gauge pipe being used for vapor return purposes.

Referring first to FIG. 1, numeral 1 denotes a subterranean storage tank, of the type customarily used at service stations for the storage of liquid fuel (gasoline). This tank is provided with the usual vent line (not shown), with a discharge or dispensing line (employing a pump suction stub, not shown), and also with a fill-pipe (not shown, which latter extends down to a point near to the tank bottom).

The pump suction stub for the tank extends down to a point spaced a few inches above the tank bottom; it will be appreciated that the tank liquid can never be pumped below the bottom end of this stub.

In accordance with the teaching in the above-identified application, a pressure/vacuum vent valve is utilized on the upper (i.e., outer) end of the tank vent line, to prevent the emission of vapor to the atmosphere during tank filling (i.e., during the tank truck unloading into the tank).

The tank 1 is located below the surface or "grade" 2, and has the usual gauge hole or gauge connection, comprising a pipe or conduit 3 (diameter normally two inches), whose upper end is located within a so-called "ground box" 4 at the surface 2 and which extends downwardly from this box to the top of the tank, being sealed at 5 through the top of the tank so as to communicate with the tank vapor space. According to standard, conventional practice a gauge stick may be inserted from the surface downwardly through the gauge conduit 3 into the tank 1, thereby to "stick" or gauge such tank. The gauge conduit or pipe 3 has at its upper end a set of male pipe threads.

According to one aspect of this invention, under "at rest" conditions of the tank 1 (this term herein relating to filling and gauging of the tank only, and not, of course, to dispensing or pumping from the tank) the upper end of gauge conduit 3 is closed or sealed off from the atmosphere. An adaptor 6, having at its lower end a set of female pipe threads adapted to mate with the threads on conduit 3, is screwed down on the upper end of conduit 3 until the adaptor internal gasket 7 seals against a ring 8 which is welded to the outside of an outer tube 9 (later described in more detail), at the upper end of such tube. Ring 8 bears aginst the upper end of pipe 3. Tube 9 is thus fixedly mounted within conduit 3. The adaptor 6 may be, for example, an "OPW 61–AS Adaptor", or an "Universal 727 Adaptor". It has, above the threads at its lower end, an outwardly-extending flange 10 in which are provided milled grooves (not shown) which permit the use of a spanner wrench for tightening down the adaptor on conduit 3. Adaptor 6 has an external vertical (cylindrical) sealing surface 11, and is generally in the form of a sleeve, being open at its upper end.

An imperforate cap, denoted generally by numeral 12, has a central dished portion 13 which fits within the open upper end of adaptor 6 and an integral outer downwardly-depending skirt portion 14 which surrounds the upper portion of the adaptor 6 and which carries an internal O-ring 15 sealing against surface 11. Cap 12 may be, for example, an "OPW 62 Cap", or a "Universal 728 Side Seal Cap". Cap 12 has, at one side of the skirt 14, an integral U-shaped hook 16 adapted to fit around the flange 10, to secure cap 12 in place on adaptor 6. Diametrically opposite to hook 16, a spring-loaded latch 17 is pivotally secured to skirt 14, this latch being adapted to hook under flange 10 to complete the fastening of cap 12 in sealing position on adaptor 6. The cap 12 may be easily attached to the adaptor 6. To do so, the cap is pushed onto the adaptor (after the hook 16 is positioned around flange 10); the spring-loaded latch 17 automatically locks the cap in place. To remove the cap, the latch 17 is squeezed and then the cap 12 is lifted off, as by means of a handle 22 on the cap.

According to this invention, a valving arrangement (assembly) including the outer tube 9 is inserted into gauge conduit 3. As previously mentioned, tube 9 is fixedly mounted within conduit 3, the ring 8 on this tube being held by adaptor 6 tightly against the upper end of gauge conduit 3. The tube 9 is coaxial or concentric with conduit 3, and fits rather closely within such conduit, so as to provide an opening of maximum cross-sectional area for vapor flow (such vapor flow will be described further hereinafter, in connection with FIG. 4). Outer tube 9 extends downwardly through conduit 3, the bottom end of this tube being located slightly below the top of tank 1.

The valving arrangement described employs two coaxial tubes, the outer tube 9 and an inner tube 18 which is arranged for vertical sliding movement with respect to tube 9. Three integral spaced centering protrusions 19 on the inner tube 18 which bear against the inner wall of the outer tube 9 serve as an upper guide for tube 18, when it moves. Inner tube 18 extends into the liquid 20 in the tank, to a point several inches (3 inches, by way of example) above the tank bottom, and below the lower end of the tank pump suction stub. Due to the fact that the lower end of tube 18 is below the tank pump suction stub, the lower end of this tube is always covered with liquid, thus providing a liquid seal thereat; hence, no vapor can enter this end of the tube.

At a level just below the top of tank 1, the inner tube 18 has therein a plurality (for example, four in number) of spaced openings or ports 21 which are adapted to serve as vapor ports. A ring seat 23, on which is mounted an O-ring seal 24, is welded to the outside of inner tube 18 just below the ports 21, care being taken to make sure that the upper and lower faces of ring seat 23 are perpendicular to the cylindrical wall of tube 18. A plug bushing 25 is press-fitted in the lower end of outer tube 9. By way of example, the total area of the four openings or ports 21 should be about equal to the cross-sectional area of the inner tube 18.

The inner tube 18 is free to slide within the outer tube, and is guided therein by means of the bushing 25 and the protrusions 19 (on inner tube 18). Inner tube 18 extends above the outer tube 9 at the top, and the inner tube carries at its upper end a ring 26 (having an O.D. such as to fit freely within the bore in adaptor 6) which is secured by means of set screws 27 to the outside of tube 18. A coiled compression spring 28, one end of which bears against the lower side of ring 26 (on inner tube 18) and the other end of which bears against the upper side of ring 8 (on outer tube 9), urges the inner tube 18 upwardly with respect to the outer tube 9. Thus, when no downwardly-acting force is applied to the upper end of the inner tube 18 (as in FIG. 2), the inner tube 18 moves upwardly, causing the vapor ports or openings 21 therein to be covered by the outer tube 9, with a ring seal 24 between the bottom of the outer tube (bushing 25) and the ring seat 23. Under these conditions, the force exerted by spring 28 keeps the inner tube 18 in its upper position, and provides a force between the ring seal 24 on the inner tube 18 and the bottom end of the outer tube 9.

When a downwardly-acting force is applied to the upper end of the inner tube 18, this tube moves down with respect to the outer tube 9 (against the force exerted by spring 28), exposing the openings (ports) 21 to the vapor portion (i.e., the upper portion) of the tank 1. Thus, when the gauge cap 12 is in place, as illustrated in FIG. 1, the dished portion 13 of this cap bears against the upper end of inner tube 18, pushing this tube downwardly and exposing the ports 21 to the tank vapor space; however, at this time the cap 12 seals the upper end of tube 18 (and hence also the tank vapor space) off from the atmosphere.

The inner tube 18 has a diameter such that a standard gauge stick 29 (see FIG. 3) can be inserted thereinto to measure the level of the liquid 20 in the tank. When it is desired to gauge the tank 1 (i.e., to measure the level of the liquid therein), the cap 12 is removed (see FIG. 2). When this is done, the force acting on the upper end of the inner tube 18 is released; the inner tube 18 then is moved upwardly by the force of spring 28, sealing off the ports 21 from the tank vapor space, and sealing off the tank vapor space from the atmosphere. (In this connection, it will be remembered that a liquid seal is provided at the bottom end of inner tube 18.) The gauge stick 29 is then inserted down through the inner tube 18 from the surface (see FIG. 3), to measure the level of liquid 20.

Refer now to FIG. 4. As disclosed in the aforementioned application, it is desired to use the gauge pipe or conduit 3 for vapor return to the tank truck when the subterranean tank is being filled. How this is accomplished according to the invention will now be described.

For vapor return (vapor recovery), a light-weight vapor return hose 30 (3 inches in diameter, by way of example) is coupled at its upper end (not shown) to a vapor return manifold on a tank truck, as described in the application previously mentioned. At its lower end, the hose 30 is fastened and sealed to one end of an elbowed fitting denoted generally by numeral 31, whose other end is adapted to be coupled to adaptor 6. At its said other end, the pipe fitting 31 is enlarged in diameter to surround the upper portion of adaptor 6; this enlarged portion carries an internal O-ring 32 which seals against surface 11 of the adaptor.

Fitting 31, like cap 12 previously described, has at one side of the portion which surrounds adaptor 6, an integral U-shaped hook 33 adapted to fit around flange 10 of the adaptor, to secure fitting 31 in place on adaptor 6, and carries, diametrically opposite thereto, a spring-loaded pivoted latch 34 which hooks under adaptor flange 10 to complete the fastening of fitting 31 to the adaptor. Fitting 31 is attached to adaptor 6, and removed therefrom, in the same manner as is cap 12 (previously described).

Fitting 31 has mounted therein a rigid bar-like member 35 which comes into engagement with the upper end of inner tube 18, and pushes this tube downwardly against the force of spring 28, when fitting 31 is attached to adaptor 6. Thus, when the vapor return fitting 31, with its hose 30, is connected to the gauge pipe adaptor 6, the inner tube 18 is depressed (just as in FIG. 1), thereby uncovering the ports 21 and coupling the vapor space of the tank 1 to the vapor return system (including the interiors of fitting 31 and of hose 30). Consequently, as the tank 1 is filled, the displaced vapor goes into the vapor return system.

A plurality of holes 36 (⅜ inch or larger in diameter, for example) are drilled through the wall of inner tube 18 near the upper end thereof, to provide a vapor communication from the annular space between the inner tube 18 and the outer tube 9, to the interior of the inner tube (and, hence, to the vapor return system). The spaces between the individual protrusions 19 on inner tube 18 allow vapor flow through the annular space between the tubes.

By way of recapitulation, the valving arrangement described herein allows vapors to be returned through the gauge conduit 3 (see FIG. 4 herein), as proposed in the aforementioned application. No driveway excavations are necessary in order to install the valving arrangement of the invention. The valving arrangement allows gauging and water surveillance to be carried out in the usual manner (see FIGS. 2 and 3 herein).

The cost of the valving arrangement described would be only a fraction of the cost of other proposed tight-break systems; moreover, such other systems would not allow gauging.

The valving arrangement of this invention could be utilized in other environments. For example, it could be applied to a so-called coaxial drop tube with vapor recovery openings around the drop tube.

The invention claimed is:

1. In a subterranean tank for the storage of a liquid hydrocarbon, the tank having a gauge conduit extending from the upper portion of the tank to ground level, a valve which prevents the flow of hydrocarbon vapors to the atmosphere while permitting passage of a gauge stick therethrough comprising:
   a. a tube passing from the ground level, downwardly through the gauge conduit, and terminating below the surface of the liquid in the tank, having an opening in its wall adjacent the top of the tank,
   b. and means for selectively covering or uncovering said opening, thereby preventing the flow of hydrocarbon vapor through the valve while permitting a gauge stick to pass through the valve to the tank bottom.

2. Apparatus claimed in claim 1, wherein said valve comprises:
   a. a pair of coaxial tubes positioned in the gauge conduit, the outer tube being sealed in said conduit and extending downwardly from the ground level to the top of the tank, the inner tube being mounted for sliding movement in the outer tube, extending downwardly into the interior of the tank, terminating below the surface of the liquid hydrocarbon in the tank, having an opening in the wall of the inner tube adjacent the top of the tank, and
   b. means normally providing a seal between the two tubes adjacent the opening.

* * * * *